United States Patent
Hoshino et al.

(10) Patent No.: US 9,939,566 B2
(45) Date of Patent: Apr. 10, 2018

(54) POLYGON MIRROR, IMAGE FORMING APPARATUS, AND METHOD FOR MANUFACTURING A POLYGON MIRROR

(71) Applicant: BROTHER KOGYO KABUSHIKI KAISHA, Nagoya-shi, Aichi-ken (JP)

(72) Inventors: Hidetaka Hoshino, Aichi (JP); Yutaka Hattori, Kuwana (JP); Toshio Sakai, Aichi (JP); Kazuhiro Hayakawa, Nagoya (JP)

(73) Assignee: BROTHER KOGYO KABUSHIKI KAISHA, Nagoya-Shi, Aichi-Ken (JP)

( * ) Notice: Subject to any disclaimer, the term of this patent is extended or adjusted under 35 U.S.C. 154(b) by 0 days.

(21) Appl. No.: 15/283,755

(22) Filed: Oct. 3, 2016

(65) Prior Publication Data

US 2017/0097450 A1  Apr. 6, 2017

(30) Foreign Application Priority Data

Oct. 5, 2015  (JP) .................. 2015-197959

(51) Int. Cl.
| | |
|---|---|
| G02B 5/09 | (2006.01) |
| G03G 15/04 | (2006.01) |
| B29C 45/27 | (2006.01) |
| B29D 11/00 | (2006.01) |
| G02B 26/12 | (2006.01) |

(Continued)

(52) U.S. Cl.
CPC ............ *G02B 5/09* (2013.01); *B29C 45/0025* (2013.01); *B29C 45/2708* (2013.01); *B29D 11/00596* (2013.01); *G02B 26/12* (2013.01); *G03G 15/0409* (2013.01); *G03G 15/04036* (2013.01); *B29C 2045/0027* (2013.01); *B29L 2011/0058* (2013.01)

(58) Field of Classification Search
CPC ......... G03G 15/04036; G03G 15/0409; G02B 5/09; G02B 26/12; B29L 2011/0058; B29C 45/0025; B29C 45/2708; B29C 2045/0027

See application file for complete search history.

(56) References Cited

U.S. PATENT DOCUMENTS

| | | | | |
|---|---|---|---|---|
| 4,902,085 A | * | 2/1990 | Murakoshi | ............... G02B 5/09 359/216.1 |
| 5,134,514 A | | 7/1992 | Murakoshi et al. | |

(Continued)

FOREIGN PATENT DOCUMENTS

| | | |
|---|---|---|
| JP | 64-29814 A | 1/1989 |
| JP | 3-214115 A | 9/1991 |
| JP | 2005-215516 A | 8/2005 |

*Primary Examiner* — Carla Therrien
(74) *Attorney, Agent, or Firm* — Merchant & Gould P.C.

(57) ABSTRACT

A polygon mirror made of plastic is provided. The polygon mirror has a plurality of reflecting surfaces, a first surface intersecting the plurality of reflecting surfaces at a first side, a second surface intersecting the plurality of reflecting surfaces at a second side opposite to the first side, with a through hole provided to extend through the first surface and the second surface at a center of the polygon mirror. The polygon mirror includes a plurality of gate marks of injection molding. When viewed from an extending direction of the through hole, the gate marks are located on straight lines passing through the center and vertices of the first surface, and are rotationally symmetric with respect to the center.

20 Claims, 13 Drawing Sheets

(51) Int. Cl.
*B29C 45/00* (2006.01)
*B29L 11/00* (2006.01)

(56) References Cited

U.S. PATENT DOCUMENTS

| | | | | |
|---|---|---|---|---|
| 5,296,959 A | * | 3/1994 | Asai | B29C 45/26 359/216.1 |
| 5,359,460 A | * | 10/1994 | Urakawa | G02B 26/121 359/198.1 |
| 7,399,094 B2 | | 7/2008 | Hirose et al. | |
| 2006/0017993 A1 | * | 1/2006 | Hirose | G02B 5/09 359/219.2 |
| 2006/0023281 A1 | | 2/2006 | Hirose et al. | |
| 2015/0226958 A1 | * | 8/2015 | Hayakawa | G02B 26/12 359/200.1 |

* cited by examiner

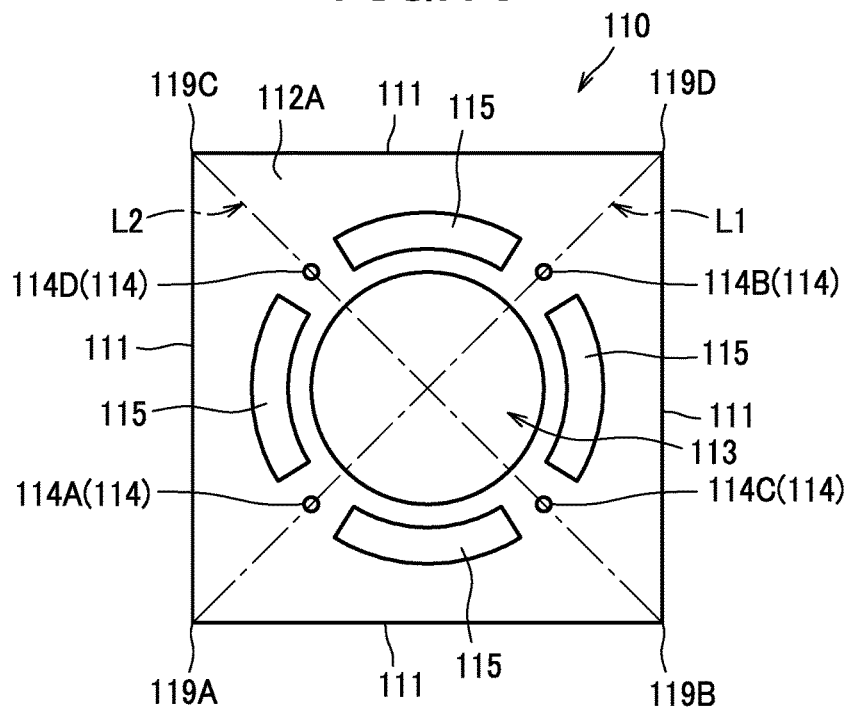
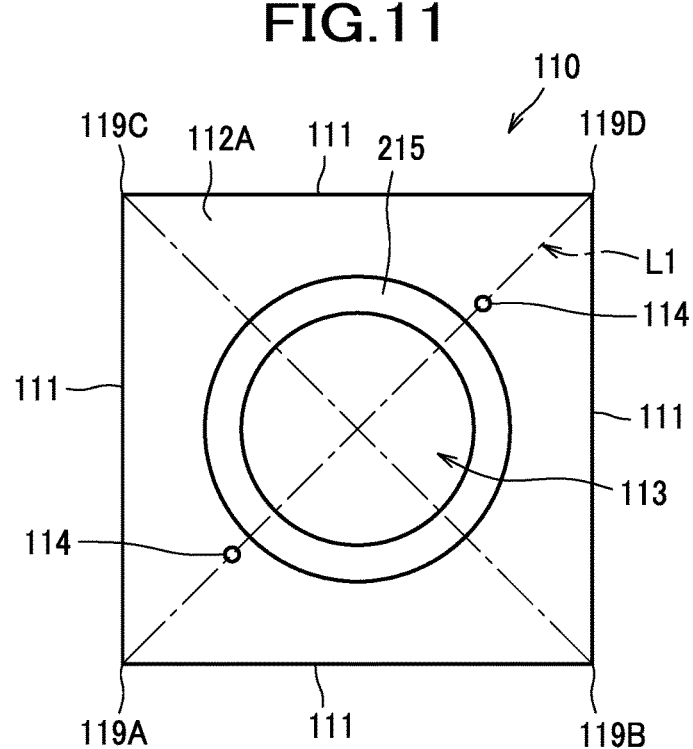

POLYGON MIRROR, IMAGE FORMING APPARATUS, AND METHOD FOR MANUFACTURING A POLYGON MIRROR

CROSS-REFERENCE TO RELATED APPLICATION(S)

This application claims priority from Japanese Patent Application No. 2015-197959 filed on Oct. 5, 2015, the disclosure of which is incorporated herein by reference in its entirety.

TECHNICAL FIELD

Apparatuses and methods disclosed herein relate to a polygon mirror molded of plastic, an image forming apparatus including such a polygon mirror, and a method for manufacturing a polygon mirror.

BACKGROUND ART

A plastic polygon mirror manufacturing method in which a polygon mirror having a through hole provided at its center is molded by injecting molten plastic through a plurality of gates into a cavity of a mold is known in the art. Arrangement of the gates in the mold (i.e., of gate marks on the final castings) are typically designed such that when seen from a direction of an axis of rotation of a polygon mirror to be molded, each of the gates (or gate marks) is located on a straight line passing through the center of the polygon mirror and a center of each of reflecting surfaces of the polygon mirror. In this arrangement, the gates are located between the through hole and the centers of the reflecting surfaces of the polygon mirror, and thus a distance between each gate and a corresponding reflecting surface is short. Accordingly, the reflecting surfaces, generally desired to be approximated to an ideal shape specific to its design specifications, are liable to degrade in accuracy of its shape because injection of the plastic into narrow spaces sandwiched between the through-hole forming portion of the core and the reflecting-surface forming surfaces of the mold raises the fluid pressure of the plastic in the portions corresponding to the centers of the reflecting surfaces to be formed.

SUMMARY

In several aspects, a polygon mirror, an image forming apparatus, and a method for manufacturing a polygon mirror are disclosed herein in which reflecting surfaces of the polygon mirror can be configured to have increased accuracy in shape.

To be more specific, in one aspect, a polygon mirror made of plastic is provided. The polygon mirror has a plurality of reflecting surfaces, a first surface intersecting the plurality of reflecting surfaces at a first side, and a second surface intersecting the plurality of reflecting surfaces at a second side opposite to the first side, the second surface facing away from the first surface, with a through hole provided to extend through the first surface and the second surface at a center of the polygon mirror. The polygon mirror comprises a plurality of gate marks of injection molding, wherein the gate marks are located on straight lines passing through the center and vertices of the first surface, and are rotationally symmetric with respect to the center, when viewed from an extending direction of the through hole.

In another aspect, an image forming apparatus is provided which comprises: a light source configured to emit a light beam; a polygon mirror made of plastic, and configured to reflect the light beam emitted by the light source; a motor configured to rotate about a rotation axis; and a scanning optical system configured to focus the light beam reflected by the polygon mirror on an image surface. The polygon mirror has a plurality of reflecting surfaces, a first surface intersecting the plurality of reflecting surfaces at a first side, and a second surface intersecting the plurality of reflecting surfaces at a second side opposite to the first side, the second surface facing away from the first surface, with a through hole provided to extend through the first surface and the second surface at a center of the polygon mirror, the through hole being configured to be coupled on the motor. The polygon mirror comprises a plurality of gate marks of injection molding, wherein when viewed from a direction of the rotation axis, the gate marks are located on straight lines passing through the center and vertices of the first surface, and are rotationally symmetric with respect to the center.

In yet another aspect, a method for manufacturing a polygon mirror made of plastic, the polygon mirror having a plurality of reflecting surfaces, a first surface intersecting the plurality of reflecting surfaces at a first side, and a second surface intersecting the plurality of reflecting surfaces at a second side opposite to the first side, the second surface facing away from the first surface, with a through hole provided to extend through the first surface and the second surface at a center of the polygon mirror is provided. The method comprises: providing a mold having a mold surface defining a cavity contoured to form a shape of the polygon mirror and a plurality of gates for injecting molten plastic therethrough into the cavity; and molding the polygon mirror by injecting the molten plastic through the plurality of gates into the cavity. The plurality of gates are provided such that when viewed from an extending direction of the through hole of the polygon mirror to be molded, the gates are located on straight lines passing through the center and vertices of the first surface, and are rotationally symmetric with respect to the center.

BRIEF DESCRIPTION OF THE DRAWINGS

The above and other aspects, their advantages and further features will become more apparent by describing in detail illustrative, non-limiting embodiments thereof with reference to the accompanying drawings, in which:

FIG. 10 is a top view of a polygon mirror according to a second modified configuration as seen from a first surface side thereof;

FIG. 11 is a top view of a polygon mirror according to a third modified configuration as seen from a first surface side thereof;

DESCRIPTION OF EMBODIMENTS

Figure 1:
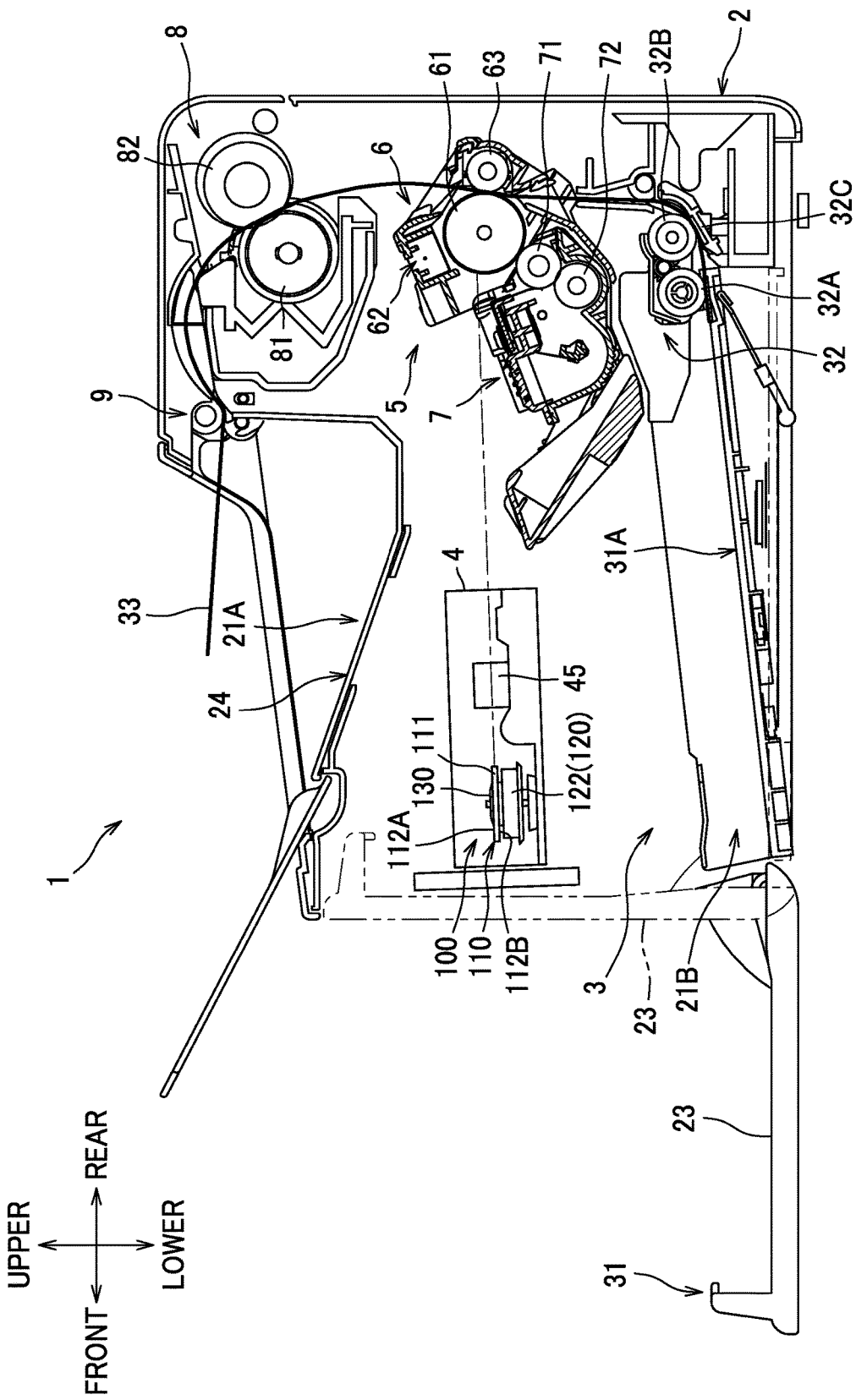
FIG. 1 is an overall view of an image forming apparatus.

A detailed description will be given of an illustrative, non-limiting embodiment with reference made to the drawings where appropriate. In the following description, a general setup of a laser printer 1 as an example of an image forming apparatus will be described at the outset, and subsequently a polygon mirror provided therein and a method for manufacturing a polygon mirror will be described in detail.

In the following description, the direction is designated such that in FIG. 1, the left-hand side of the drawing sheet corresponds to the "front" side of the printer, the right-hand side of the drawing sheet corresponds to the "rear" side of the printer, the front side of the drawing sheet corresponds to the "right" side of the printer, the back side of the drawing sheet corresponds to the "left" side of the printer, and the upper/lower or top/bottom sides (upward/downward directions) of the drawing sheet corresponds to the "upper/lower or top/bottom" sides of the printer.

As shown in FIG. 1, a laser printer 1 principally includes a housing 2, a feeder unit 3, a scanner 4 as an example of an optical scanning device, a process cartridge 5, and a fixing device 8.

The housing 2 is provided with a front cover 23 configured to be swingable relative to the housing 2. When the front cover 23 is frontwardly swung open to expose an insertion opening 21B, the insertion opening 21B becomes available, so that sheets 33 (e.g., of paper) can be inserted through the insertion opening 21B and set in the housing 2.

The feeder unit 3 is disposed in a lower space within the housing 2, and principally includes a sheet feed tray 31 and a sheet feed mechanism 32. The sheet feed tray 31 is configured to receive sheets 33, and the sheet feed mechanism 32 is configured to pick up and feed one sheet from the sheets placed on the sheet feed tray 31.

The sheet feed tray 31 is comprised of a base plate 31A disposed in the lower space within the housing 2 and a rear side of the front cover 23 configured to be available when the front cover 23 is open. The sheet feed mechanism 32 principally includes a sheet feed roller 32A, a separation roller 32B, and a separation pad 32C.

In the feeder unit 3, sheets 33 placed on the sheet feed tray 31 are fed out by the sheet feed roller 32A and one sheet separated from the others between the separation roller 32B and the separation pad 32C is conveyed toward the process cartridge 5.

The scanner 4 is disposed in a front-side space within the housing 2, and configured to sweep a light beam over a peripheral surface of a photoconductor drum 61 which will be described later. Detailed structure of the scanner 4 will be described later.

The process cartridge 5 is disposed in a rear-side and approximately central space above the sheet feed mechanism 32 within the housing 2. The process cartridge 5 is configured to be removably installable from an upper-front direction into the housing 2 through an opening 21A that appears when a top cover 24 swingably provided on the housing 2 is swung open. The process cartridge 50 includes a drum unit 6 and a development cartridge 7 as an example of a development device.

The drum unit 6 includes a photoconductor drum 61 as an example of a photoconductor, a charger 62, and a transfer roller 63. The development cartridge 7 includes a development roller 71 and a supply roller 72.

In the development cartridge 7, toner stored in a toner reservoir is supplied to the development roller 71 by the supply roller 72, and positively charged toner is carried on the development roller 71. In the drum unit 6, the peripheral surface of the rotating photoconductor drum 61 is uniformly charged by the charger 62, and exposed to and scanned with a light beam directed from the scanner 4. This lowers an electric potential of an exposed region on the peripheral surface of the photoconductor drum 61, so that an electrostatic latent image as formulated based on image data is formed on the peripheral surface of the photoconductor drum 61.

Subsequently, this electrostatic latent image is supplied with toner from the development cartridge 7, and a toner image is formed on the peripheral surface of the photoconductor drum 61. Thereafter, a sheet 33 is pinched between and conveyed by the photoconductor drum 61 and the transfer roller 63, so that the toner image carried on the peripheral surface of the photoconductor drum 61 is transferred onto the sheet 33.

The fixing device 8 is disposed in an upper and rear-side space above the process cartridge 5 within the housing 2. The fixing device 8 principally includes a heating roller 81 and a pressure roller 82.

In this fixing device 8, toner transferred on a sheet 33 is thermally fixed during a time for which the sheet 33 is being passed through between the heating roller 81 and the pressure roller 82. The sheet 33 with a toner image thermally fixed thereon in the fixing device 8 is conveyed to an ejection roller 9 provided downstream of the fixing device 8, and is ejected onto the top cover 24 through the ejection roller 9.

Figure 2:
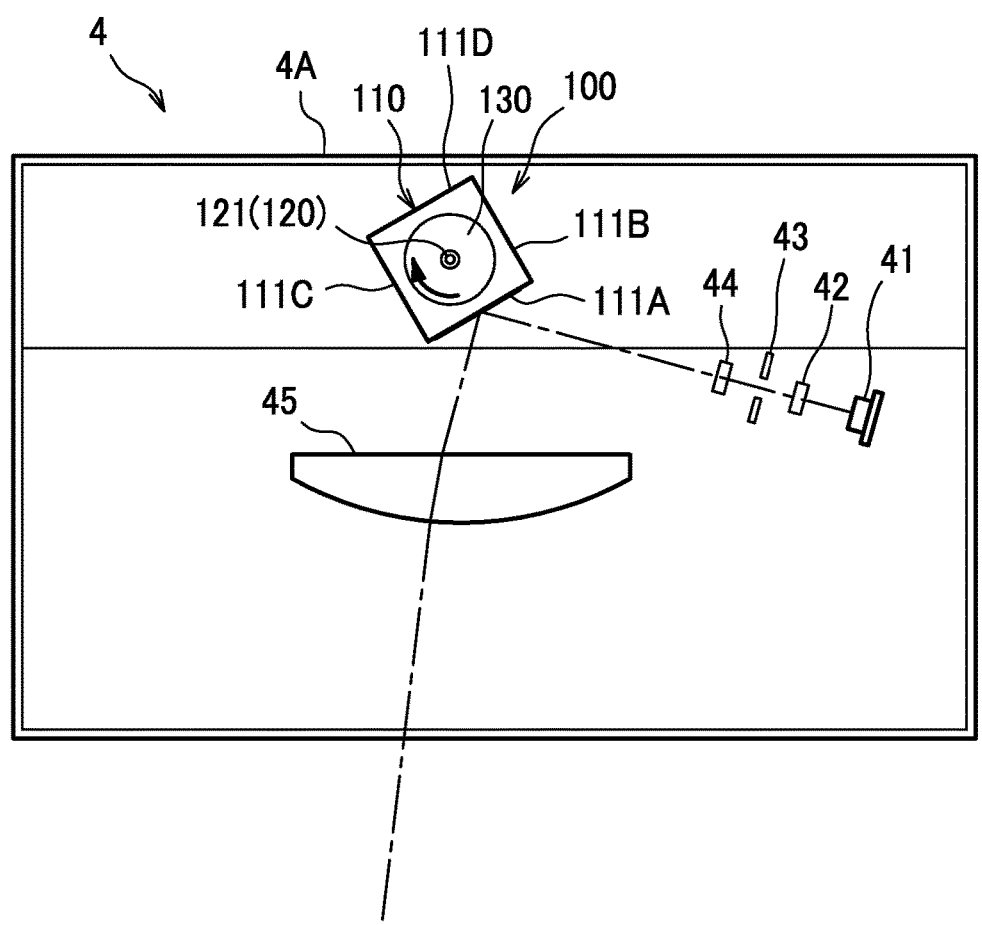
FIG. 2 is a plan view of a scanner.

As shown in FIGS. 1 and 2, the scanner 4 includes a semiconductor laser 41, a coupling lens 42, an aperture stop 43, a cylindrical lens 44, a light deflector 100, and a scanning lens 45 as an example of a scanning optical system, and other elements. In this scanner 4, the semiconductor laser 41 and the coupling lens 42 serve as an example of a light source configured to emit a light beam. These elements are supported on a casing 4A. Laser light emitted from the semiconductor laser 41 passes through the coupling lens 42, the aperture stop 43 and the cylindrical lens 44, and is deflected by the light deflector 100, further passing through the scanning lens 45, and is finally focused on the peripheral surface of the photoconductor drum 61 to form an electrostatic image thereon.

The semiconductor laser 41 shown in FIG. 2 is a device that emits divergent laser light. Light-emitting elements provided in the semiconductor laser 41 are regulated to be turned on and off based on a signal for an image to be represented on the peripheral surface of the photoconductor drum 61 under a controller (not shown). The coupling lens 42 is configured to convert the laser light emitted from the semiconductor laser 41 into a light beam (parallel rays of light directed through the aperture stop 43 to the cylindrical lens 44).

The aperture stop 43 is a member having an opening configured to determine the diameter of the light beam coming from the coupling lens 42. The cylindrical lens 44 is a lens configured to cause the light beam having passed through the aperture stop 43 to be converged in a sub scanning direction (a direction perpendicular to the drawing sheet in FIG. 2) and focused on or near a reflecting surface of a polygon mirror 110 that will be described later.

The light deflector 100 includes a polygon mirror 110, a motor 120 and a pressing member 130. A detailed description of the light deflector 100 will be given later.

The scanning lens 45 is configured to cause the light beam having been reflected and thus deflected by the polygon mirror 110 to be focused on the peripheral surface (an example of an image surface) of the photoconductor drum 61. The scanning lens 45 has f-theta characteristics such that a light beam deflected at a constant angular velocity by the polygon mirror 110 is converted into a light beam that scans the peripheral surface of the photoconductor drum 61 at a constant linear velocity.

Next, the light deflector 100 is described in detail.

The polygon mirror 110 is molded of plastic, and configured to spin at a constant rotational speed about a rotary shaft 121 (rotation axis) of the motor 120 to thereby cause the light beam having passed through the cylindrical lens 44 to be deflected in a main scanning direction. The polygon mirror 110 has reflecting films (e.g., of aluminum, or the like) evaporated on its surfaces. The polygon mirror 110 is shaped like a prism having approximately square bases.

Figure 3A:
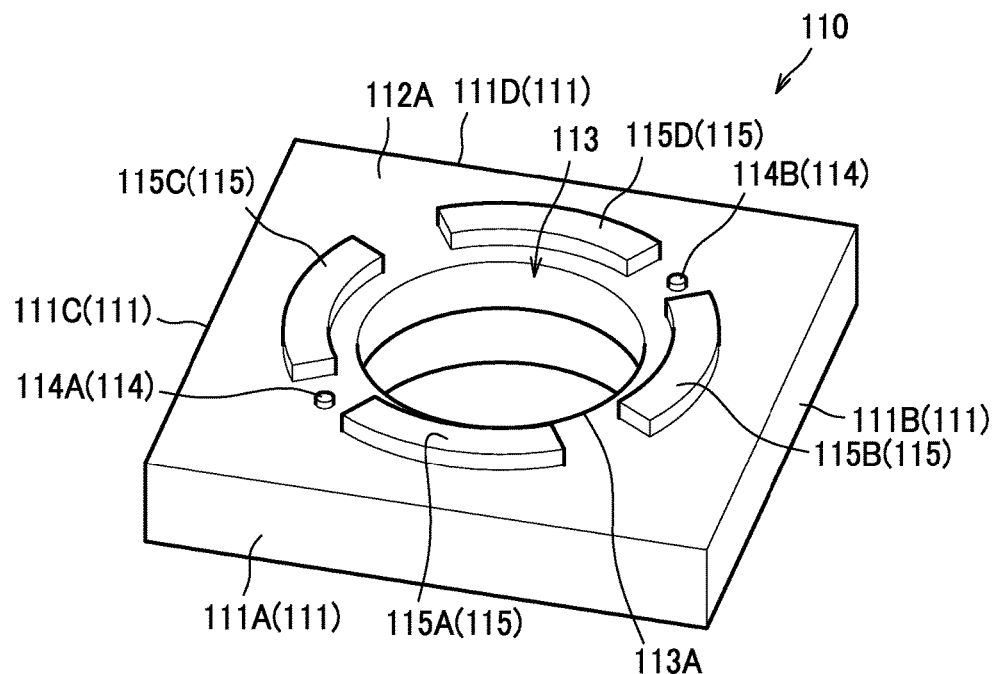
FIG. 3A is a perspective view of a polygon mirror as seen from a first surface side thereof.
Figure 3B:
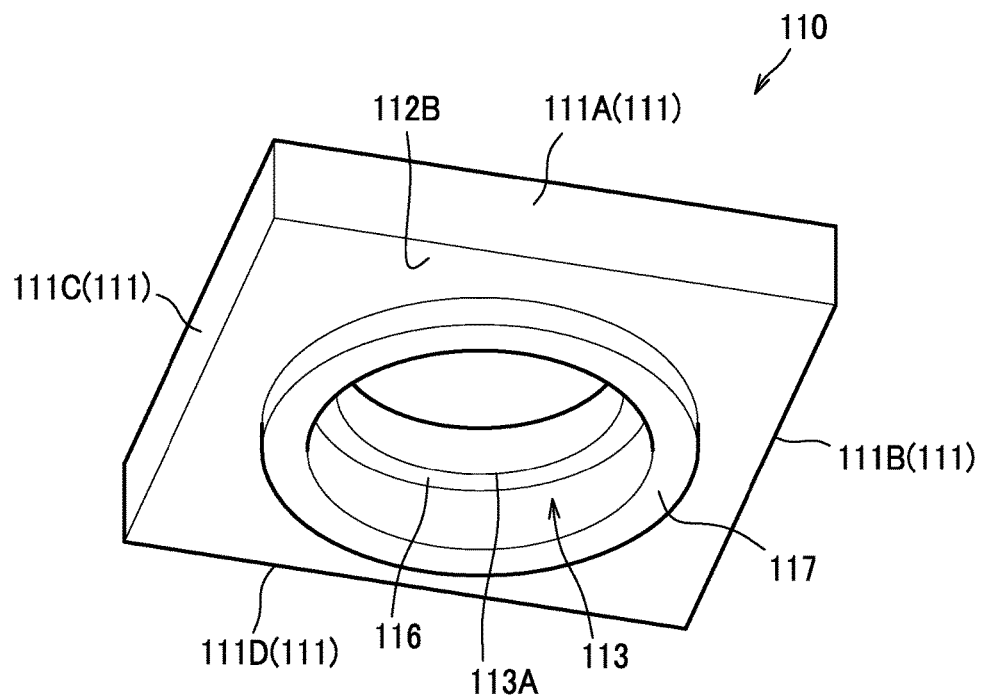
FIG. 3B is a perspective view the polygon mirror as seen from a second surface side thereof.

As shown in FIGS. 3A and 3B, the polygon mirror 110 has a plurality of (specifically, four) reflecting surfaces 111, a first surface 112A intersecting the four reflecting surfaces 111 at an upper (first) side, and a second surface 112B intersecting the four reflecting surfaces 111 at a lower (second) side (i.e., the first and second surfaces 112A, 112B face away from each other). In other words, the prismatic polygon mirror 110 has four reflecting surfaces 111 defining the sides of the prism, and the first and second surfaces 112A, 112B defining the bases of the prism.

The four reflecting surfaces 111 are each configured as a rectangular flat surface. It is to be understood that the term "flat surface" used herein refers to a surface that may not be necessarily of a perfectly flat shape but may include a convex or concave surface having a sufficiently large radius of curvature. The four reflecting surfaces 111 include a reflecting surface 111A, a reflecting surface 111B, a reflecting surface 111C, and a reflecting surface 111D. The reflecting surface 111B is adjacent to the reflecting surface 111A at a following side of the reflecting surface 111A, and the reflecting surface 111C is adjacent to the reflecting surface 111A at an advancing side of the reflecting surface 111A (herein, the "following side" refers to a trailing-edge side that moves behind a leading-edge side herein referred to similarly as "advancing side" when the polygon mirror 110 spins in a direction indicated by an arrow in FIG. 2). The reflecting surface 111D that is opposite to (facing away from) the reflecting surface 111A is adjacent to the reflecting surface 111B at a following side of the reflecting surface 111B, and adjacent to the reflecting surface 111C at an advancing side of the reflecting surface 111C. In other words, the four reflecting surfaces 111A, 111B, 111D, 111C are arranged adjacently one after another in this order in the counterclockwise direction of FIG. 3A.

Figure 4A:
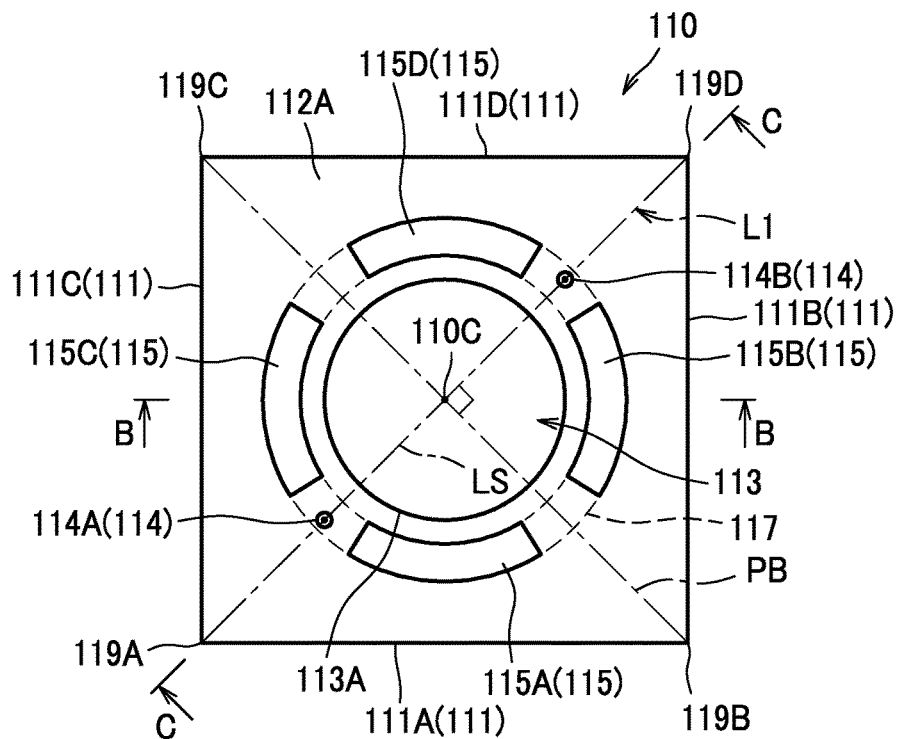
FIG. 4A is a top view of the polygon mirror as seen from the first surface side thereof.

The first surface 112A and the second surface 112B are each configured as a flat surface having a square contour. The polygon mirror 110 has a through hole 113 provided to extend through the first surface 112A and the second surface 112B in their central positions (at a center of the polygon mirror 110) in a direction perpendicular to the first surface 112A and the second surface 112B. In other words, the first surface 112A and the second surface 112B are pierced by the through hole 113 so that the first (upper) side and the second (lower) side of the polygon mirror 110 communicate with each other by means of the through hole 113 provided in its central position. As shown in FIG. 4A, the through hole 113 has a circular shape as viewed from a direction of extension (extending direction) of the through hole 113.

Referring back to FIGS. 3A and 3B, the polygon mirror 110 comprises gate marks 114 of injection molding, first projections 115 as an example of a projection or projections, a depression 116, and a second projection 117.

The gate marks 114 are protrusive structures that represent traces of plastic injected through gates 224 of a mold 200, which will be described later, left at the gates 224 after an injection molding process. The gate marks 114 are located on the first surface 112A, and configured to protrude from the first surface 112A. In this illustrative configuration, the polygon mirror 110 includes two gate marks 114 (114A, 114B).

As shown in FIG. 4A, the gate marks 114A, 114B are located on a straight line L1 passing through a center 110C of the polygon mirror 110 and two nonadjacent vertices 119A, 119D of the first surface 112A that are on one diagonal of the square first surface 112A when viewed from the direction of extension of the through hole 113. Additionally, the gate marks 114A, 114B are rotationally symmetric with respect to the center 110C of the polygon mirror 110 when viewed from the direction of extension of the through hole 113. To be specific, the gate marks 114A, 114B are located in such positions that rotation by an angle of 180 degrees of one of these gate marks 114A, 114B results in coincidence of the other one of the gate marks 114A, 114B. More specifically, the gate marks 114A, 114B are located on the same straight line L1 passing through the center 110C, on opposite sides of the center 110C, and equidistant from the center 110C.

The gate mark 114A is located on the straight line L1 and between the center 110C of the polygon mirror 110 and the vertex 119A positioned on an edge along which the adjacent reflecting surfaces 111A, 111C intersect. The gate mark 114B is located on the straight line L1 and between the center 110C and the vertex 119D positioned on an edge along which the adjacent reflecting surfaces 111B, 111D intersect.

The positions in which gate marks 114A, 114B are located are such that when viewed from the direction of extension of the through hole 113, the perpendicular bisector PB of segment LS connecting the adjacent gate marks 114A, 114B pass through two vertices 119B, 119C of the first surface 112A that are on the other diagonal of the square first surface 112A. Moreover, the position in which the gate mark 114A is located is such that a distance from the gate mark 114A to a peripheral edge 113A of the through hole 113 is shorter than a distance from the gate mark 114A to the corresponding vertex 119A (the vertex closest to the gate mark 114A) of the first surface 112A, and the position in which the gate mark 114B is located is such that a distance from the gate mark 114B to the peripheral edge 113A of the through hole 113 is shorter than a distance from the gate mark 114B to the corresponding vertex 119D (the vertex closest to the gate mark 114B) of the first surface 112A.

The first projections 115 are projections provided on a surface of the polygon mirror 110 on which the gate marks 114 are located (i.e., the first surface 112A). The first projections 115 protrude from the first surface 112A (see FIG. 3A). The first projections 115 are each shaped like an arc or a segment of a circle the center of which coincides with the center 110C of the polygon mirror 110 when viewed from the direction of extension of the through hole 113. Each of the first projections 115 is located in a position shifted from the positions of the gate marks 114; that is, the first projections 115 are located so as not to overlap the gate marks 114.

As illustrated, the number of the first projections 115 is the same as the number of the reflecting surfaces 111, that is, four. These four first projections 115 include a first projection 115A corresponding to the reflecting surface 111A, a first projection 115B corresponding to the reflecting surface 111B, a first projection 115C corresponding to the reflecting surface 111C, and a first projection 115D corresponding to the reflecting surface 111D. Each first projection 115 is so located between the corresponding reflecting surface 111 and the peripheral edge 113A of the through hole 113 as to face to the corresponding reflecting surface 111, as viewed from the direction of extension of the through hole 113.

The four first projections 115A, 115B, 115C, 115D are rotationally symmetric with respect to the center 110C of the polygon mirror 110 when viewed from the direction of extension of the through hole 113. In other words, the four first projections 115A, 115B, 115C, 115D are located at angular distances of 90 degrees around the circumference of the through hole 113. The positions in which the four first projections 115A, 115B, 115C, 115D are located are such that the first projections 115A, 115B, 115C, 115D overlap with the gate marks 114A, 114B in the circumferential direction, i.e., there can be assumed to exist a circle of which the center coincides with the center 110C and which intersects all of the four first projections 115A, 115B, 115C, 115D and the two gate marks 114A, 114B.

Figure 4B:
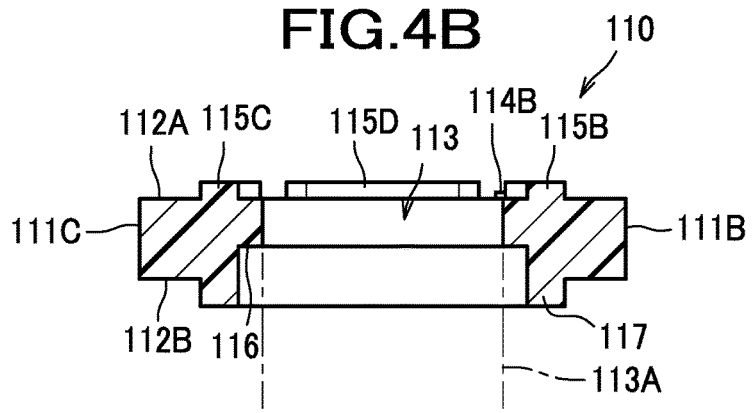
FIG. 4B is a sectional view taken along the line B-B of FIG. 4A.
Figure 4C:
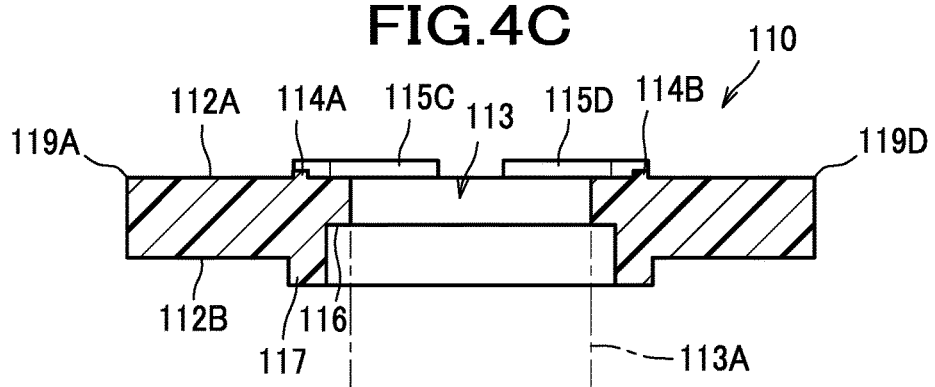
FIG. 4C is a sectional view taken along the line C-C of FIG. 4A.

As shown in FIGS. 4B and 4C, the four first projections 115A, 115B, 115C, 115D protrude to an extent greater than an extent to which each of the gate marks 114A, 114B protrudes from the first surface 112A. To give an example, the height or extent of protrusion of the first projections 115A, 115B, 115C, 115D may be on the order of 0.5 mm higher than the maximum height of the gate marks 114A, 114B. It is to be understood that the heights (extents of protrusion) of the gate marks 114A, 114B may vary but are regulated with the maximum height set as a specific upper limit.

The depression 116 recessed from the central region of the second surface 112B toward the first surface 112A is provided as a structure of the polygon mirror 110 in which a rotor 122 of the motor 120 is to be fitted. To be more specific, the depression 116 having a shape recessed from the second surface 112B toward the first surface 112A is provided along the peripheral edge 113A of the through hole 113 to surround and define the through hole 113. Accordingly, the depression 116 has a bottom shaped like a circular belt along the peripheral edge 113A of the through hole 113. The through hole 113 is configured to allow the rotary shaft 121 of the motor 120 to be disposed therein. Thus, the through hole 113 is configured to be coupled on the motor 120.

The second projection 117 is provided on the second surface 112B, and configured to protrude from the second surface 112B. To be more specific, the second projection 117 having a cylindrical shape protruding from the second surface 112B is provided along the outer peripheral edge of the depression 116 to surround and define the through hole 113 and the depression 116 (see FIG. 3B). In other words, the second projection 117 is shaped like a circle (circular belt) the center of which coincides with the center 110C of the polygon mirror 110 when viewed from the direction of extension of the through hole 113. The second projection 117 is located in a position such that the second projection 117 overlaps the first projections 115A, 115B, 115C, 115D when viewed from the direction of extension of the through hole 113.

Figure 5:
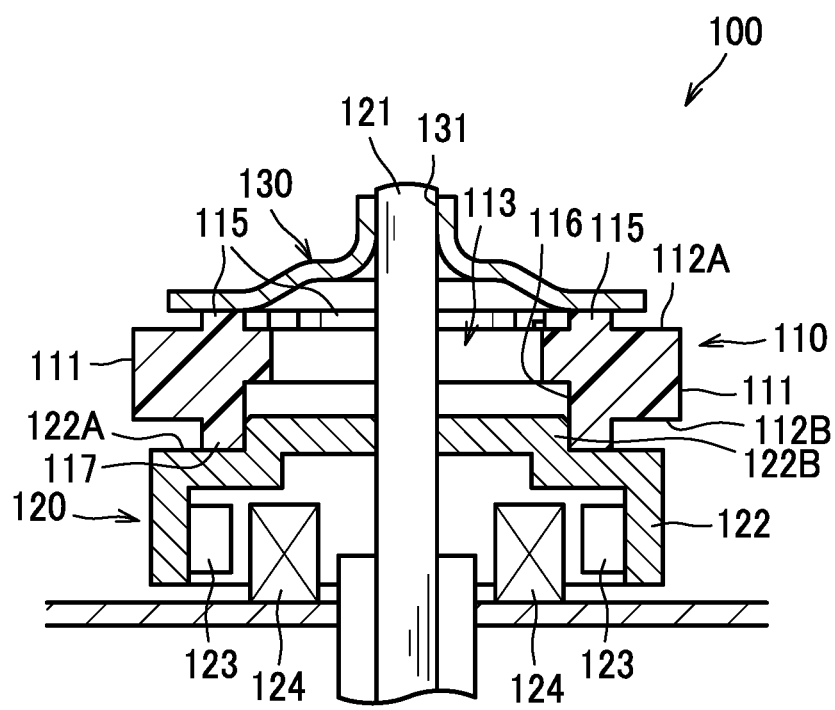
FIG. 5 is a sectional view of a light deflector.

As shown in FIG. 5, the motor 120 is configured to rotate or spin the polygon mirror 110, and includes a rotary shaft 121 and a rotor 122 configured to rotate together with the rotary shaft 121.

The motor 120 includes permanent magnets 123 fixed to the rotor 122, and a coil 124 fixed as a stator in the light deflector 100 and so positioned as to face the permanent magnets 123. The motor 120 is configured such that the passage of electric current through the coil 124 imparts a force to the permanent magnets 123 to cause the rotor 122 to rotate about the rotation axis.

The rotor 122 has a rotor surface 122A facing to the polygon mirror 110, and includes a rotor projection 122B protruding from the rotor surface 122A and having an outer peripheral surface (cylindrical surface coaxial with the rotary shaft 121). The rotor projection 122B is configured such that when its outer peripheral surface is fitted in the depression 116 of the polygon mirror 110, the polygon mirror 110 is centered in alignment with the motor 120.

The rotor 122 is configured such that when the rotor projection 122B is fitted in the depression 116, the rotor surface 122A comes in contact with the second projection 117. To be more specific, the rotor surface 122A is in contact only with the second projection 117 of the polygon mirror 110 and is separate from any other portion (other than the second projection 117) of the polygon mirror 110.

The pressing member 130 is a member having a springiness. The pressing member 130 is disposed to cover the first surface 112A of the polygon mirror 110. The pressing member 130 includes a central portion bulging upward and outer end portions brought into contact with the four first projections 115, as shown in FIG. 5. The pressing member 130 has a hole 131 provided in its central portion and sized to allow the rotary shaft 121 of the motor 120 extending through the through hole 113 of the polygon mirror 110 to be press-fitted therein. The press-fitting of the rotary shaft 121 in the hole 131 of the pressing member 130 causes the pressing member 130 to yield at a portion between each first projection 115 and the hole 131, producing a downward biasing force (downward in FIG. 5; i.e., toward the rotor 122). Thus, the pressing member 130 with its end portions pressed against the first projections 115 presses the polygon mirror 110 toward the rotor 122 of the motor 120 in the axial direction (direction of an axis of rotation of the polygon mirror 110).

Next, a method for manufacturing a polygon mirror 110 will be described.

Figure 6:
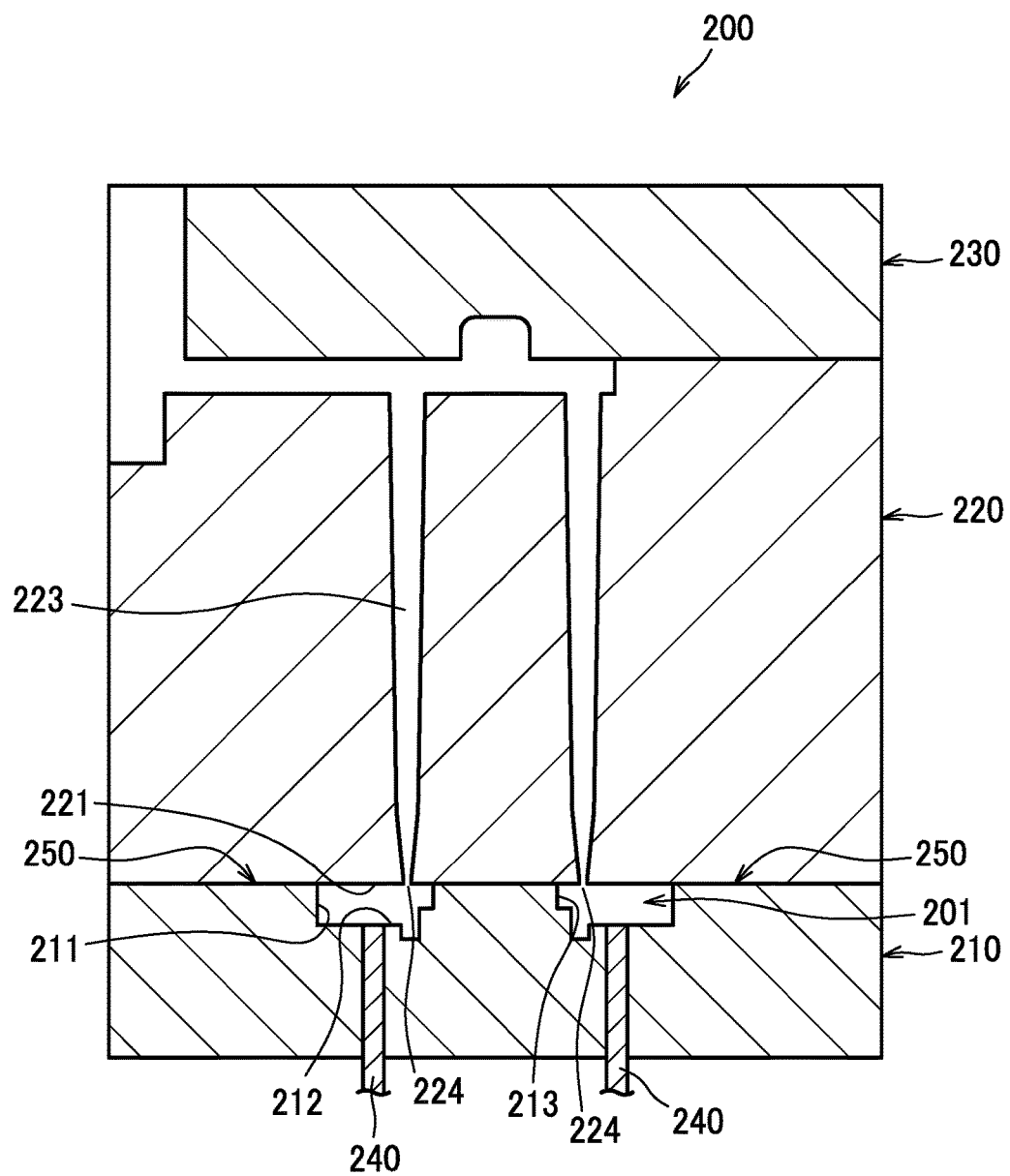
FIG. 6 is a schematic diagram of a mold for molding a polygon mirror.

This method uses a mold 200 as an example of a mold as shown in FIG. 6. The mold 200 has a cavity (mold surface) 201 contoured to form a shape of the polygon mirror 110. The mold 200 used herein is made of alloy steel.

The mold 200 includes a movable mold plate 210, a stationary mold plate 220, and a stripper plate 230, by way of example.

The movable mold plate 210 is configured to have reflecting-surface forming surfaces 211 configured to form the four reflecting surfaces 111, a second-surface forming surface 212 configured to form the second surface 112B and the second projection 117, and a through-hole forming surface 213 configured to form the through hole 113 and the depression 116. To be more specific, the second-surface forming surface 212 has a recessed region or hollow positioned, shaped and dimensioned to conform to the second projection 117 to be formed. The movable mold plate 210 is provided with a plurality of ejector pins 240.

The stationary mold plate 220 is configured to have a first-surface forming surface 221 configured to form the first surface 112A and the first projections 115. To be more specific, the first-surface forming surface 221 has a recessed region or hollow positioned, shaped and dimensioned to conform to the first projections 115 to be formed. The first-surface forming surface 221, in conjunction with the reflecting-surface forming surfaces 211 and the second-surface forming surface 212 and the through-hole forming surface 213 of the movable mold plate 210, forms the cavity 201. The stationary mold plate 220 has runners 223 through which molten plastic fed into the sprue of the mold 200 flows, and a plurality of (two in the illustrated example) gates 224 for injecting therethrough molten plastic from the runners 223 into the cavity 201.

Figure 8:
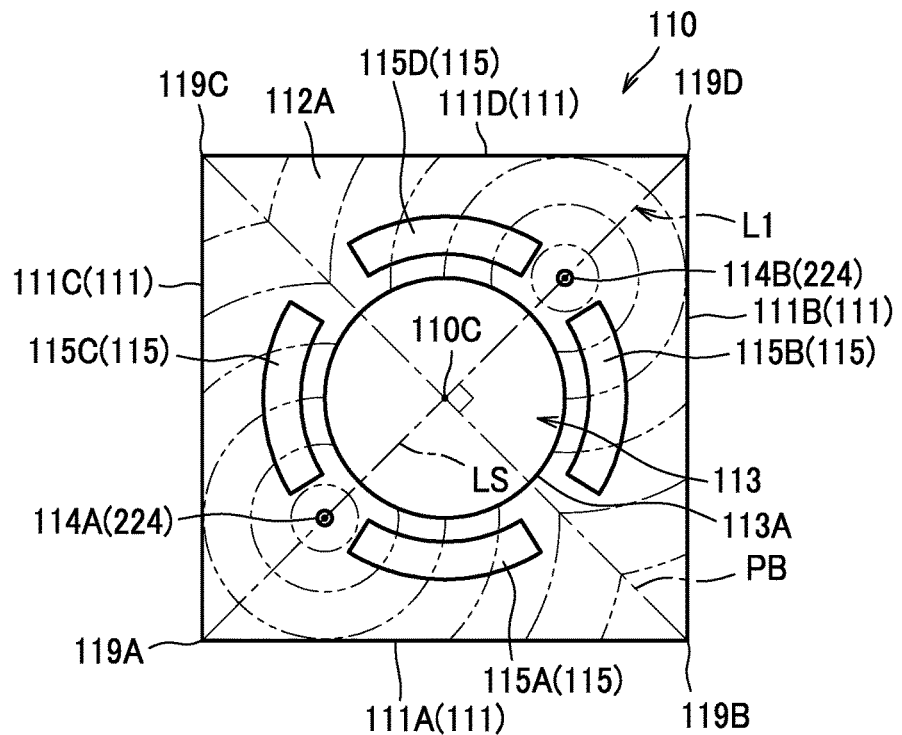
FIG. 8 is a diagram showing a flow of molten plastic injected during an injection molding process.

The two gates 224 are provided in positions corresponding to the aforementioned positions of the gate marks 114A, 114B formed on the first surface 112A of the polygon mirror 110 as shown in FIG. 8, i.e., such that when the polygon mirror 110 to be molded is viewed from the direction of extension of its through hole 113, the gates 224 are located on the straight line L1 passing through the center 110C of the polygon mirror 110 and vertices 119A, 119D of the first surface 112A of the polygon mirror 110 (corresponding corners formed in the cavity 201), and are rotationally symmetric with respect to the center 110C. Moreover, the positions in which the two gates 224 are located are such that when the polygon mirror 110 to be molded is viewed from the direction of extension of the through hole 113, the perpendicular bisector PB of the segment LS connecting the adjacent gates 224 pass through the vertices 119B, 119C (corners in the cavity 201) of the first surface 112A of the polygon mirror 110 to be molded.

Referring back to FIG. 6, the stripper plate 230 is a member used to strip and remove remnant of plastic left in the runner 223 from the molded polygon mirror 110.

When the polygon mirror 110 is manufactured, the first step to be executed is the step of preparing a mold 200 as shown in FIG. 6. To be more specific, the movable mold plate 210 and the stationary mold plate 220 are clamped to form the cavity 201. In this step, a vent or vents 250 are formed between the movable mold plate 210 and the stationary mold plate 220. The vent 250 is a shallow gap or opening sized in the range of 0.01 to 0.02 mm to allow air in the cavity 201 or gases generated from plastic material to escape from the cavity 201. The vents 250 are located in positions corresponding to the outer edge of the first surface 112A of the polygon mirror 110.

Figure 7A:
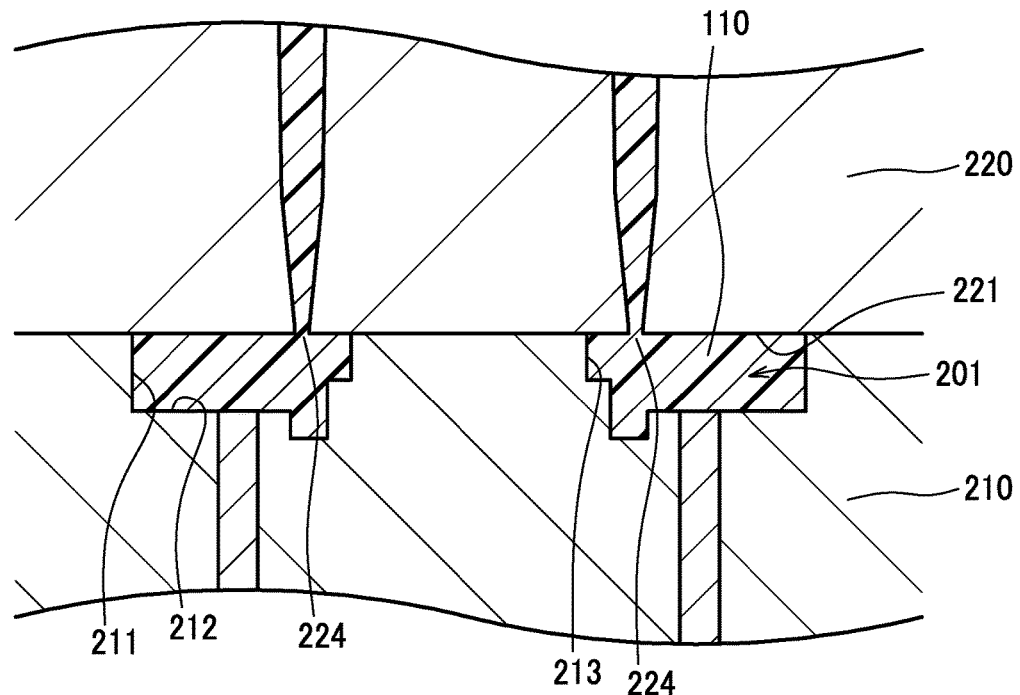
FIG. 7A is a diagram showing a process step of molding the polygon mirror.

Next, as shown in FIG. 7A, the step of molding the polygon mirror 110 by injecting the molten plastic through the two gates 224 into the cavity 201 is executed. In this step, air in the cavity 201 or gases generated from plastic material are forced out through the vents 250, while the injected plastic does not pass through the vent(s) 250. Thereafter, once the plastic material is solidified, the stripper plate 230 is separated from the stationary mold plate 220 and the movable mold plate 210 to strip and remove the plastic left in the runner 223 from the molded article (polygon mirror 110), and the movable mold plate 210 and the stationary mold plate 220 are separated from each other (these steps are not illustrated in the drawings).

Figure 7B:
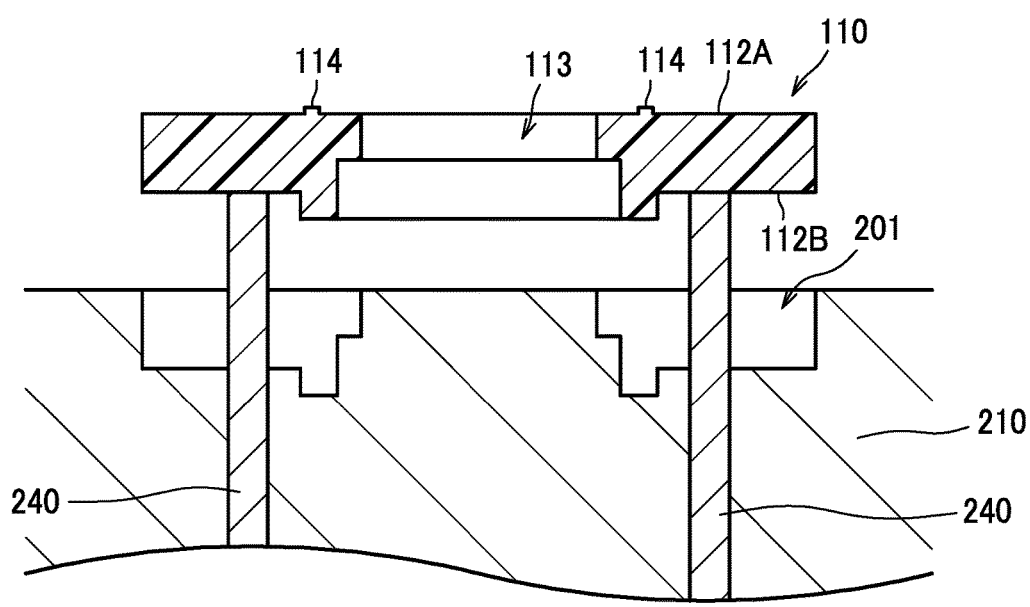
FIG. 7B is a diagram showing a process step of removing the molded polygon mirror from the mold.

Then, as shown in FIG. 7B, the molded polygon mirror 110 are separated from the movable mold plate 210 by the plurality of ejector pins 240 pushing the second surface 112B (i.e. surface facing away from the surface having the gate marks 114) of the polygon mirror 110.

In this manufacturing method, the step of molding the polygon mirror 110 by injecting molten plastic into the cavity 201 involves formation of the through hole 113 in the polygon mirror 110, and thus the step of making an opening after removal of the molded article from the movable mold plate 210 is not required.

According to the illustrative configuration described above, as compared with an alternative configuration in which the gates for injecting molten plastic therethrough into the cavity are located on a straight line connecting the center of the polygon mirror to be molded and the center of its reflecting surface, the distance between the gate 224 corresponding to the gate mark 114 and the reflecting-surface forming surfaces 211 corresponding to the reflecting surfaces 111 can be made greater. Therefore, the pressure of plastic material produced at the center of the reflecting-surface forming surface 211 corresponding to the center of each reflecting surface 111 to be formed when the plastic is injected through the gates 224 during the injection molding process can be reduced, and the difference of residual stress remaining after completion of the injection molding between the center and the outer edge of the reflecting surface 111 can be made smaller, so that the accuracy in the shape of the reflecting surface 111 can be improved. In other words, according to the present configuration, influence of the pressure of the plastic on the center of the reflecting surface 111 to be formed during the injection molding process can be reduced, and the reflecting surface 111 can be formed with increased accuracy in shape.

Since the positions in which the gate marks 114A, 114B are located are, as shown in FIG. 8, such that when viewed from the direction of extension of the through hole 113, the perpendicular bisector PB of segment LS connecting the adjacent gate marks 114A, 114B pass through the vertices 119B, 119C of the first surface 112A, the plastic injected through the adjacent gates 224 fills the cavity 201 while spreading as shown by chain double-dashed lines in FIG. 8 in the cavity 201, and merge on the perpendicular bisector PB during the injection molding process of the polygon mirror 110. Accordingly, the weld line that would possibly become a cause of impairing the accuracy in shape is formed on the perpendicular bisector PB, and the risk of affecting the shapes of the reflecting surfaces 111 during the injection molding process can be minimized. Thus, the risk of the plastic flow affecting the shapes of the reflecting surfaces 111 during the injection molding process can be reduced, so that the accuracy in the shape of the reflecting surfaces 111 can be increased.

Since the through hole 113 has a circular shape, the flow of the molten plastic can be kept uniform as compared with an alternative configuration, for example, in which the through hole has a rectangular shape. With this circular-shape configuration, as well, the risk of the plastic flow affecting the shapes of the reflecting surfaces 111 during the injection molding process can be reduced, and the accuracy in the shape of the reflecting surfaces 111 can be increased.

Since the positions in which the gate marks 114 are located are such that the a distance from each gate mark 114 to the peripheral edge 113A of the through hole 113 is shorter than a distance from the gate mark 114 to the corresponding vertex 119A or 119D of the first surface 112A, the shortest distance between the gate 224 corresponding to each gate mark 114 and the corresponding reflecting-surface forming surface 211 can be made greater. With this feature, as well, the risk of the plastic flow affecting the shapes of the reflecting surfaces 111 during the injection molding process can be reduced, and the accuracy in the shape of the reflecting surfaces 111 can be increased.

Since the gate marks 114 are provided on the first surface 112A, the degree of flexibility in arrangement of the gates 224 can be increased. Accordingly, the degree of freedom in the design of the mold 200 can be increased.

Since the first projections 115 protruding from the first surface 112A to an extent greater than an extent to which the gate marks 114 protrude from the first surface 112A are provided on the first surface 112A on which the gate marks 114 are provided, the protrusive gate marks 114 can be prevented from becoming a cause of interference, and thus the polygon mirror 110 can be handled with increased ease, when the polygon mirrors 110 are stacked on top of each other for storage, or the reflecting film is evaporated on the surfaces of the polygon mirror 110 after completion of the injection molding.

Since the number of the first projections 115 provided is the same as the number of the reflecting surfaces 111, and the first projections 115 are rotationally symmetric with respect to the center 110C of the polygon mirror 110, the flow of the molten plastic fed during the molding of the polygon mirror 110 having the first projections 115 can be kept uniform. Consequently, the risk of the plastic flow affecting the reflecting surfaces 111 during the injection molding process can be reduced as a whole.

Since the depression 116 recessed from the second surface 112B toward the first surface 112A is provided along the peripheral edge 113A of the through hole 113, the rotor 122 of the motor 120 can be fitted neatly in the polygon mirror 110 by making use of this depression 116.

Although one illustrative, non-limiting embodiment has been described above, the present invention is not limited to the described embodiment. Any changes or modifications to the specific configurations and features may be made where appropriate.

For example, the first surface 112A on which the gate marks 114 are located may not be at the upper side, but at the lower side; in other words, the first side at which the first surface 112A intersects the plurality of reflecting surfaces 111 may be the lower side of the polygon mirror 110, and the gate marks 114 may be provided on the first surface that is at the lower side of the polygon mirror 110. In this configuration, the gate marks 114 may protrude from the first surface downward toward the rotor 122.

Figure 9:
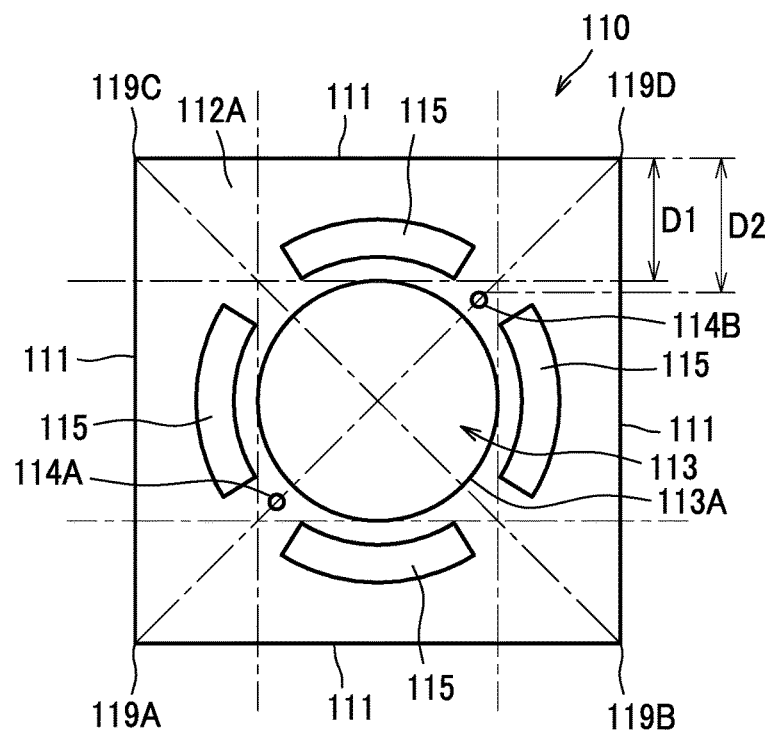
FIG. 9 is a top view of a polygon mirror according to a first modified configuration as seen from a first surface side thereof.

Although the illustrated configuration of the polygon mirror 110 is such that the gate marks 114A, 114B are located in such positions that a distance from each gate mark 114A, 114B to the peripheral edge 113A of the through hole 113 is shorter than a distance from the gate mark 114A, 114B to the corresponding vertex 119A, 119D of the first surface 112A, the gate marks 114A, 114B may be located by far closer to the peripheral edge 113A of the through hole 113. For example, as shown in FIG. 9, the positions in which the gate marks 114A, 114B are located may be such that the gate marks 114A, 114B are distanced farther from the reflecting surfaces 111 at a distance longer than the shortest distance D1 between the peripheral edge 113A of the through hole 113 and the reflecting surfaces 111. In other words, the gate marks 114A, 114B are located such that the shortest distance D2 from each of the gate marks 114A, 114B to the reflecting surfaces 111 is longer than the shortest distance D1 between the peripheral edge 113A and the reflecting surfaces 111.

With this configuration, the shortest distance between the gate 224 corresponding to each gate mark 114A, 114B and the reflecting-surface forming surfaces 211 corresponding to the reflecting surfaces 111 can be made longer; accordingly, the influence of the flow of the plastic material toward the reflecting-surface forming surfaces 211 during the injection molding process on the reflecting surfaces 111 of the polygon mirror 110 to be molded can be made smaller. As a result, the accuracy in the shape of the reflecting surfaces 111 can be further improved.

In the above description, the polygon mirror 110 having four reflecting surfaces 111 with two gate marks 114 are illustrated by way of example, but various other configurations may be considered to be feasible. For example, as shown in FIG. 10, a polygon mirror 110 having four reflecting surfaces 111 may be provided with the same number of (i.e., four) gate marks 114 (114A, 114B, 114C, 114D) as the number of the reflecting surfaces 111. Similar to the above-described illustrative configuration, the gate marks 114A, 114B are located on the straight line L1 passing through the center 110C of the polygon mirror 110 and the vertices 119A, 119D. In the alternative configuration shown in FIG. 10, additionally, the gate marks 114C, 114D are located on the straight line L2 passing through the center 110C of the polygon mirror 110 and the vertices 119B, 119C of the first surface 112A. All the gate marks 114A, 114B, 114C, 114D are rotationally symmetric with respect to the center 110C.

The above-described illustrative configuration of the polygon mirror 110 is such that the first projections 115A, 115B, 115C, 115D are each shaped like a segment of a circle the center of which coincides with the center 110C of the polygon mirror 110 when viewed from the direction of extension of the through hole 113, but the various other configurations may be considered to be feasible. For example, as shown in FIG. 11, only one first projection 215 having a cylindrical shape may be provided, instead. In this alternative configuration shown in FIG. 11, the first protrusion 215 is located in a position shifted in the radial directions of the through hole 113 from the positions in which the gate marks 114 are located, as viewed from the direction of extension of the through hole 113.

Figure 12:
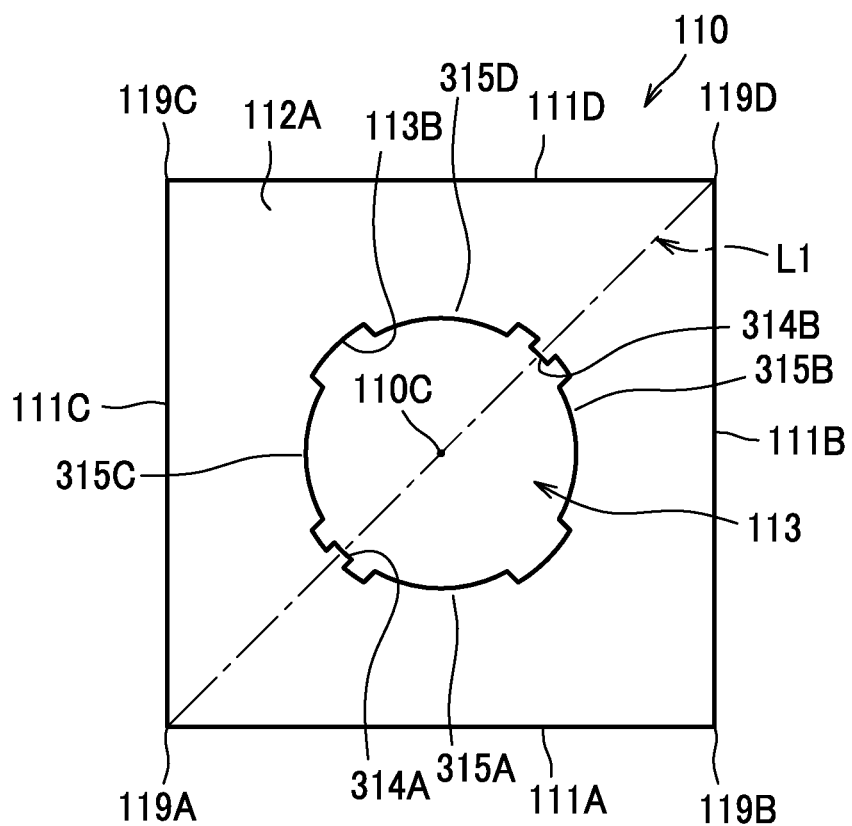
FIG. 12 is a top view of a polygon mirror according to a fourth modified configuration as seen from a first surface side thereof.

The above-described illustrative configuration of the polygon mirror 110 is such that the gate marks 114 are provided on the first surface 112A (one of the surfaces intersecting the plurality of the reflecting surfaces 111) and protrude from the first surface 112A, but various other configurations may be considered to be feasible. For example, as shown in FIG. 12, gate marks 314A, 314B may be provided on an inner peripheral surface 113B defining the through hole 113 and protrudes from the inner peripheral surface 113B defining the through hole 113, instead. In this alternative configuration shown in FIG. 12, the gate marks 314A, 314B are located on the straight line L1 passing through the center 110C of the polygon mirror 110 and the vertices 119A, 119B of the first surface 112A, and are rotationally symmetric with respect to the center 110C, when viewed from the direction of extension of the through hole 113.

With this alternative configuration, during the injection molding process, the molten plastic is injected through the gates into the cavity outwardly in the radial directions of the through hole 113; therefore, the flow of the molten plastic in the radial outward directions can be made smooth and steady.

Further, in the alternative configuration shown in FIG. 12, on the inner peripheral surface 113B defining the through hole 113 (i.e. the surface having the gate marks 314A, 314B) of the polygon mirror 110, projections 315A, 315B, 315C, 315D protruding from the inner peripheral surface 113B defining the through hole 113 to an extent greater than an extent to which the gate marks 314A, 314B protrude from the inner peripheral surface 113B are provided instead of the first projections 115. The number of the projections 315A, 315B, 315C, 315D is the same as the number of the reflecting surfaces 111A, 111B, 111C, 111D (i.e., four), and the projections 315A, 315B, 315C, 315D are rotationally symmetric with respect to the center 110C of the polygon mirror 110 as viewed from the direction of extension of the through hole 113.

With this alternative configuration, in which the projections 315A, 315B, 315C, 315D are located together with the gate marks 314A, 314B on the inner peripheral surface 113B defining the through hole 113, the projections 315A, 315B, 315C, 315D can be utilized, for example, as positioning guides by which the rotor of the motor to be fitted in the through hole 113 or a shaft to be inserted in the through hole 113 when reflecting film is evaporated on the rotating polygon mirror 110 after injection molding is located in place.

The illustrated configuration of the polygon mirror 110 is such that the first surface 112A and the second surface 112B of the polygon mirror 110 (i.e., the polygonal bases of a prism) are configured to have a square shape, but various other configurations may be considered to be feasible. For example, as shown in FIG. 13, a polygon mirror 410 may be configured to have a first surface 412 and a second surface (not shown) shaped like a hexagon as bases of a prism, and six reflecting surfaces 411 as sides of the prism.

Figure 13:
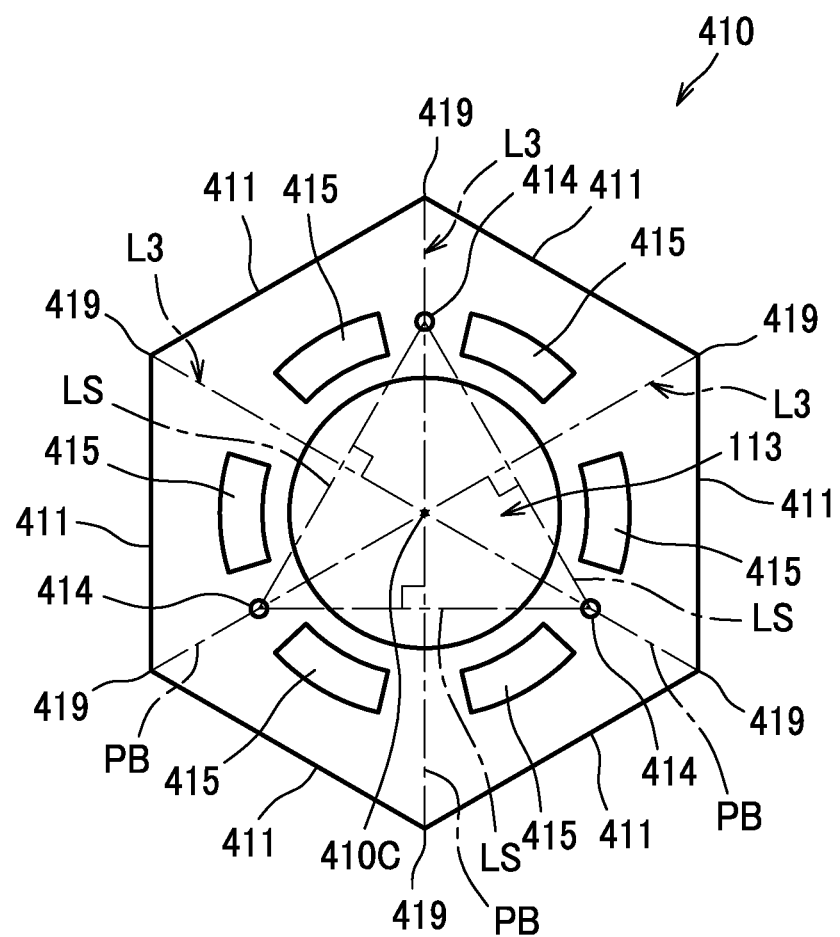
FIG. 13 is a top view of a polygon mirror according to a fifth modified configuration as seen from a first surface side thereof.

In this alternative configuration shown in FIG. 13, the polygon mirror 410 includes three gate marks 414. All the three gate marks 414 are located on the diagonals L3 joining the opposite vertices 419 of the hexagonal first surface 412A (i.e., on the straight lines L3 passing through the center 410C of the polygon mirror 410 and the corresponding vertices 419 of the first surface 412A), and are rotationally symmetric with respect to the center 410C, when viewed from the direction of extension of the through hole 113. The three gate marks 414 are located such that perpendicular bisectors PB of segments LS connecting adjacent gate marks 414 pass through vertices 419 of the first surface 412A, when viewed from the direction of extension of the through hole 113. To be more specific, each of the gate marks 414 passing through the corresponding diagonal joining the vertices 419 is located such that the perpendicular bisector PB of the segment LS connecting two other gate marks 414 adjacent thereto passes through the other vertices 419 located on the diagonal of the hexagonal first surface 412A.

Put this another way, referring now to FIGS. 4A and 13, the plurality of gate marks 114, 414 provided in the polygon mirror 110, 410 having an even number of reflecting surfaces 111, 411, on the straight lines L1, L3 and rotationally symmetric with respect to the center 110C, 410C are arranged such that the number of straight lines L1, L3 passing through the center 110C, 410C and the vertices 119, 419 is an odd number.

In this respect, the number of the gate marks 414 in the configuration shown in FIG. 13 may be two, or six that is the same number as the number of the reflecting surfaces 411.

In the polygon mirror 410 shown in FIG. 13, the polygon mirror 410 includes first projections 415 provided on the first surface 412A. Each of the first projections 415 is shaped like a segment of a circle as viewed from the direction of extension of the through hole 113, and protrudes from the first surface 412A to an extent greater than an extent to which the gate marks 414 protrude from the first surface 412A. The number of the first projections 415 is six that is the same as the number of the reflecting surfaces 411. The first projections 415 are arranged rotationally symmetric with respect to the center 410C of the polygon mirror 410.

Alternatively, the polygon mirror may have a shape of an octagonal prism with two octagonal bases (first and second surfaces) and eight sides (reflecting surfaces). In principle, the number of reflecting surfaces may be selected without limitation.

Figure 14A:
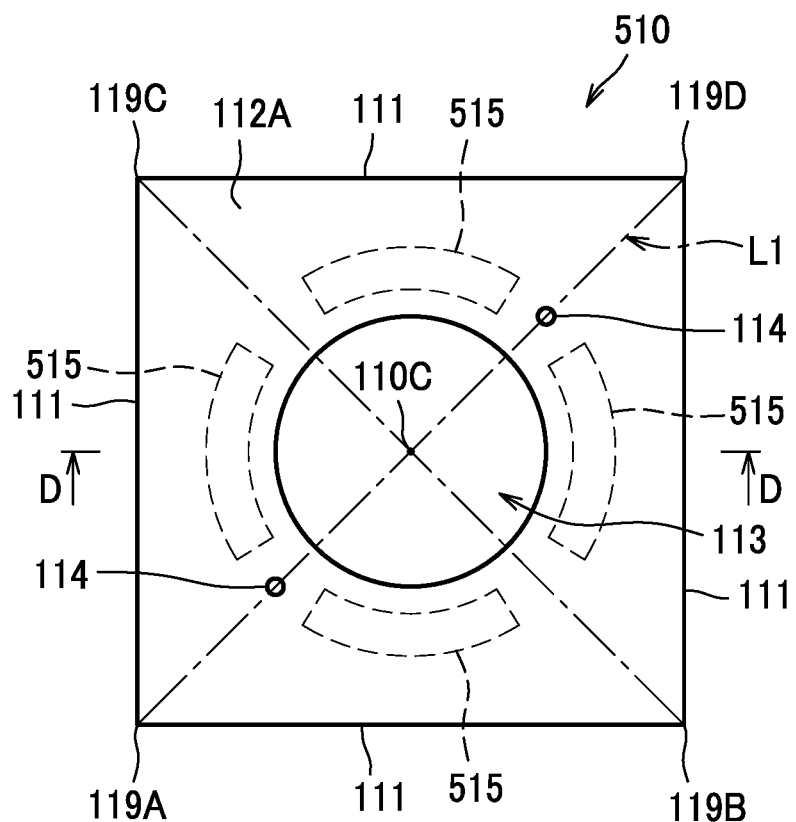
FIG. 14A is a top view of a polygon mirror according to a sixth modified configuration as seen from a first surface side thereof.
Figure 14B:
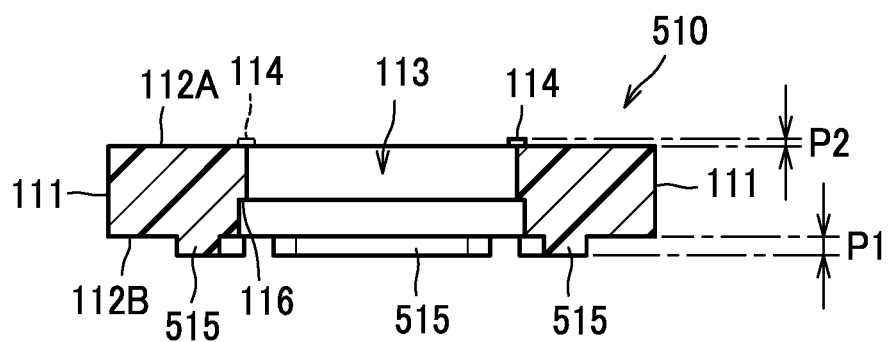
FIG. 14B is a sectional view of the polygon mirror taken along the line D-D of FIG. 14A.

In the above description, the polygon mirror 110 includes first projections 115 as an example of a projection, provided on the first surface 112A with gate marks 114 provided thereon, but various other configurations may be considered to be feasible. For example, as shown in FIGS. 14A, 14B, a polygon mirror 510 includes projections 515 on the second surface 112B. The projections 515 protrude from the second surface 112B to an extent P1 greater than an extent P2 to which the gate marks 114 protrude from the first surface 112A.

In this alternative configuration shown in FIG. 14, each of the projections 515 is shaped like a segment of a circle the center of which coincides with the center 110C of the polygon mirror 110 when viewed from the direction of extension of the through hole 113. The number of the projections 515 is four that is the same number as the number of the reflecting surfaces 111. The projections 515 are arranged rotationally symmetric with respect to the center 110C of the polygon mirror 510. Each of the projections 515 is located in a position shifted from the gate marks 114 as viewed from the direction of extension of the through hole 113; that is, the projections 515 are located so as not to overlap the gate marks 114.

With this alternative configuration, during the injection molding process, the molten plastic is injected through the gates into the cavity toward the opposite side at which the projections 515 are to be formed; therefore, the molten plastic flows smoothly into the depressions in the cavity contoured to form the projections 515, so that the polygon mirror 510 with the projections 515 can be formed appropriately in a desired shape. The projections 515 protrude to an extent greater than an extent to which each of the gate marks 114 protrudes; therefore, for example, when the molded polygon mirrors 110 are stacked on top of each other for storage purposes, the possibility of an undesirable contact of the gate marks 114 with the second surface 112B of the adjacent polygon mirror 510 can be considerably reduced or substantially prevented.

Figure 15:
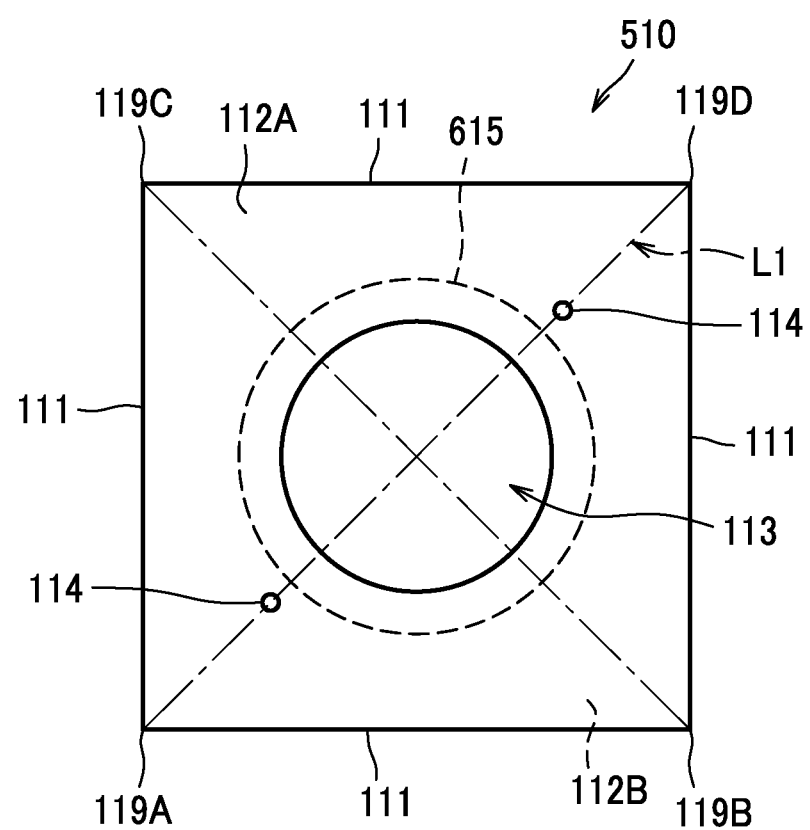
FIG. 15 is a top view of a polygon mirror according to a seventh modified configuration as seen from a first surface side thereof.

The number of the projections is not required to be more than one as long as the projection is located in a position shifted from the gate marks 114 when the polygon mirror is viewed from the direction of extension of the through hole. Thus, a single-projection configuration may be feasible; for example, as shown in FIG. 15, one cylindrical projection 615 may be provided, instead of a plurality of projections 515 as in FIG. 14. In this alternative configuration shown in FIG. 15, the projection 615 is located in a position shifted in radial directions of the through hole 113 from the gate marks 114, when the polygon mirror 510 is viewed from the direction of extension of the through hole 113.

It is understood that with the configuration shown in FIG. 14 in which the projections 515 are provided discontinuously in the circumferential direction (i.e., not in the form of a continuous cylinder), the total contact areas of the projections 515 with the rotor surface 122A of the rotor 122 of the motor 120 made when the rotor projection 122B is fitted in the depression 116 of the polygon mirror 510 (see FIG. 5) can be reduced. As a result, advantageously, heat transfer from the motor 120 to the polygon mirror 510 can be reduced effectively.

In the illustrated configuration of the polygon mirror 110, the through hole 113 has a circular shape as viewed from the direction of its extension; however, various other configurations may be feasible. For example, the through hole may be configured to have a polygonal shape.

In the above description, the process of molding a polygon mirror 110 is configured to form a through hole 113 in the polygon mirror 110 simultaneously with the step of injecting molten plastic into a cavity 201, but various alternative configurations may be feasible. For example, the polygon mirror to be molded by injecting molten plastic into a cavity may alternatively be configured to have a blind hole (not a through hole) formed in the center of the polygon mirror.

In the above description, the scanning optical system configured to focus a light beam reflected by the polygon mirror on an image surface is illustrated as the scanning lens 45, but various other configurations may be feasible. For example, the scanning optical system may be comprised of a plurality of lenses and/or mirrors. The image surface is not limited to the peripheral surface of the photoconductor drum 61; for example, a surface of a belt-type photoconductor may be adopted as an image surface, instead.

The specific configuration of the mold 200 has been described above by way of example only, and various other configurations of a mold may be consistent with the present invention. For example, the above-described three-plate mold 200 which includes the movable mold plate 210, the stationary mold plate 220, and the stripper plate 230 may be replaced with any mold of two-plate type known in the art.

In the above description, the laser printer 1 for forming a monochrome image is illustrated as an example of an image forming apparatus, but various other types of printer may be adopted. For example, a printer may be configured to form a multicolor image. Furthermore, a copier or a multifunction peripheral with a document scanner device such as a flat-bed scanner, etc. may be configured as described herein.

What is claimed is:

1. A polygon mirror made of plastic, the polygon mirror having a plurality of reflecting surfaces, and a first surface intersecting the plurality of reflecting surfaces at a first side, a second surface intersecting the plurality of reflecting surfaces at a second side opposite to the first side, the second surface facing away from the first surface, with a through hole provided to extend through the first surface and the second surface at a center of the polygon mirror, the polygon mirror comprising:

a plurality of gate marks of injection molding, wherein the gate marks are located on straight lines passing through the center and vertices of the first surface, and are rotationally symmetric with respect to the center, when viewed from an extending direction of the through hole.

2. The polygon mirror according to claim 1, wherein when viewed from the extending direction of the through hole, the gate marks are located in positions such that perpendicular bisectors of segments connecting adjacent gate marks pass through vertices of the first surface.

3. The polygon mirror according to claim 1, wherein the through hole has a circular shape as viewed from the extending direction of the through hole.

4. The polygon mirror according to claim 1, wherein the gate marks are located in positions such that a distance from a gate mark to a nearest peripheral edge of the through hole is shorter than a distance from the gate mark to a corresponding vertex of the first surface closest to the gate mark.

5. The polygon mirror according to claim 4, wherein the positions in which the gate marks are located are such that a distance from each of the gate marks to the nearest reflecting surface is longer than a shortest distance between the peripheral edge of the through hole and the reflecting surfaces.

6. The polygon mirror according to claim 1, wherein the gate marks are provided on the first surface.

7. The polygon mirror according to claim 1, wherein the gate marks are provided on an inner peripheral surface that defines the through hole.

8. The polygon mirror according to claim 1, further comprising a projection provided on a surface on which the gate marks are provided, which projection protrudes from the surface to an extent greater than extents to which the gate marks protrude from the surface.

9. The polygon mirror according to claim 6, further comprising a projection provided on the second surface, which projection protrudes from the second surface to an extent greater than extents to which the gate marks protrude from the first surface,
wherein when viewed from the extending direction of the through hole, the projection is located in a position shifted from the positions in which the gate marks are located.

10. The polygon mirror according to claim 1, further comprising projections protruding to an extent greater than extents of protrusion of the gate marks, the number of the projections being same as the number of the reflecting surfaces, wherein when viewed from the extending direction of the through hole, the projections are rotationally symmetric with respect to the center and each shifted from positions in which the gate marks are located.

11. The polygon mirror according to claim 1, further comprising a depression recessed from the second surface toward the first surface along a peripheral edge of the through hole.

12. An image forming apparatus comprising:
a light source configured to emit a light beam;
a polygon mirror made of plastic, and configured to reflect the light beam emitted by the light source;
a motor comprising a rotary shaft configured to rotate about a rotation axis; and
a scanning optical system configured to focus the light beam reflected by the polygon mirror on an image surface,
wherein the polygon mirror has a plurality of reflecting surfaces, a first surface intersecting the plurality of reflecting surfaces at a first side, and a second surface intersecting the plurality of reflecting surfaces at a second side opposite to the first side, the second surface facing away from the first surface, with a through hole provided to extend through the first surface and the second surface at a center of the polygon mirror, the through hole being configured to be coupled to the rotary shaft, wherein the polygon mirror comprises a plurality of gate marks of injection molding, and wherein when viewed from a direction of the rotation axis, the gate marks are located on straight lines passing through the center and vertices of the first surface, and are rotationally symmetric with respect to the center.

13. A method for manufacturing a polygon mirror made of plastic, the polygon mirror having a plurality of reflecting surfaces, a first surface intersecting the plurality of reflecting surfaces at a first side, and a second surface intersecting the plurality of reflecting surfaces at a second side opposite to the first side, the second surface facing away from the first surface, with a through hole provided to extend through the first surface and the second surface at a center of the polygon mirror, the method comprising:

providing a mold having a mold surface defining a cavity contoured to form a shape of the polygon mirror and a plurality of gates for injecting molten plastic therethrough into the cavity; and molding the polygon mirror by injecting the molten plastic through the plurality of gates into the cavity, wherein the plurality of gates are provided such that when viewed from an extending direction of the through hole of the polygon mirror to be molded, the gates are located on straight lines passing through the center and vertices of the first surface, and are rotationally symmetric with respect to the center.

14. The method according to claim 13, wherein when viewed from the extending direction of the through hole of the polygon mirror to be molded, the gates are located in positions such that perpendicular bisectors of segments connecting adjacent gates pass through corners formed in the cavity which correspond to vertices of the first surface of the polygon mirror to be molded.

15. The method according to claim 13, wherein the mold surface comprises a through-hole forming surface contoured to form an inner peripheral surface defining the through hole of the polygon mirror to be molded, and wherein the gates are located in positions such that a shortest distance from a gate to the through-hole forming surface is shorter than a distance from the gate to one of corners formed in the cavity which correspond to vertices of the first surface of the polygon mirror to be molded, the one of the corners being closest to the gate among other corners.

16. The method according to claim 13, wherein the mold surface comprises a first-surface forming surface contoured to form the first surface of the polygon mirror to be molded, and wherein the gates are provided in the first-surface forming surface.

17. The method according to claim 16, wherein the mold surface comprises a second-surface forming surface contoured to form the second surface of the polygon mirror to be molded, and a hollow provided in the second-surface forming surface, which hollow is recessed from the second-surface forming surface to an extent greater than extents to which gate marks to be left as traces of the injected plastic after the molding at positions in which the gates are located during the molding protrude from the first surface, and wherein when viewed from the extending direction of the through hole of the polygon mirror to be molded, the hollow is located in a position shifted from the positions in which the gates are located.

18. The method according to claim 13, wherein the mold surface comprises a through-hole forming surface contoured to form an inner peripheral surface defining the through hole of the polygon mirror to be molded, and wherein the gates are provided in the through-hole forming surface.

19. The method according to claim 13, wherein the mold surface has a hollow provided in a surface in which the gates are provided, which hollow is recessed from the surface to an extent greater than extents to which gate marks to be left as traces of the injected plastic after the molding at positions in which the gates are located during the molding protrude.

20. The method according to claim 13, wherein the mold surface has hollows recessed to an extent greater than extents of protrusion of gate marks to be left as traces of the injected plastic after the molding at positions in which the gates are located during the molding, the number of the hollows being same as the number of the reflecting surfaces of the polygon mirror to be molded, wherein when viewed from the extending direction of the through hole of the polygon mirror to be molded, the hollows are rotationally symmetric with respect to the center and each shifted from positions in which the gate marks are to be located.

* * * * *